US011923649B2

(12) United States Patent
Volkov

(10) Patent No.: US 11,923,649 B2
(45) Date of Patent: Mar. 5, 2024

(54) INLINE COMPRESSION RF CONNECTOR

(71) Applicant: Carlisle Interconnect Technologies, Inc., St. Augustine, FL (US)

(72) Inventor: Peter Volkov, Torrance, CA (US)

(73) Assignee: Carlisle Interconnect Technologies, Inc., St. Augustine, FL (US)

( * ) Notice: Subject to any disclaimer, the term of this patent is extended or adjusted under 35 U.S.C. 154(b) by 0 days.

(21) Appl. No.: 17/474,905

(22) Filed: Sep. 14, 2021

(65) Prior Publication Data

US 2023/0085352 A1 Mar. 16, 2023

(51) Int. Cl.

*H01R 9/05* (2006.01)
*H01R 24/40* (2011.01)
*H01R 13/24* (2006.01)

(52) U.S. Cl.

CPC ........... *H01R 9/0527* (2013.01); *H01R 24/40* (2013.01); *H01R 13/2421* (2013.01)

(58) Field of Classification Search

CPC .. H01R 24/542; H01R 13/6315; H01R 24/50; H01R 41/00

See application file for complete search history.

(56) References Cited

U.S. PATENT DOCUMENTS 5,936,421 A * 8/1999 Stowers ................. G01R 15/12 324/755.02
6,053,777 A * 4/2000 Boyle ................ H01R 13/2421 439/700

* cited by examiner

*Primary Examiner* — Ross N Gushi
(74) *Attorney, Agent, or Firm* — Wood Herron & Evans LLP

(57) ABSTRACT

A connector includes a housing having a bore therein. A center conductor element is positioned in the bore and includes a center conductor pin. The center conductor pin is spring-biased to move longitudinally in the housing bore for being compressed. A ground sleeve element is coaxially arranged around the center conductor element and is also spring-biased to move longitudinally in the housing bore for being compressed. The center conductor element and ground sleeve element are coupled together for moving together in the housing bore when compressed. The compressed elements maintain their same coaxial position in the housing bore with respect to each other when the connector is compressed.

16 Claims, 10 Drawing Sheets

INLINE COMPRESSION RF CONNECTOR

FIELD OF THE INVENTION

This invention relates generally to cables and connectors for handling electrical and data signals and specifically to a connector having compressible conductor components for RF performance.

BACKGROUND OF THE INVENTION

RF cables and associated connectors are used for a variety of different applications including testing and data signal transmission. Such applications may require the connector to interface with circuit board signal traces and/or other mating connectors. Furthermore, various applications may include a high density of connectors at the connection plane for the electrical connections that must be made between, for example, electronic power supplies, sensors, activators, circuit boards, bus wiring, wiring harnesses, and other elements to provide the electrical pathways needed to transport electricity in the form of control signals and power signals. There is also a need for solutions in applications in the defense and aerospace markets. The signal integrity and reliability requirements for operating in certain environments and applications are stringent, and therefore, it is important to have superior ground and signal isolation. This is particularly so with high frequency RF applications. Also, such connectors and contacts therein must work in a wide frequency range and wide variety of environmental conditions such as mechanical, vibration, wide temperature ranges, etc.

While various solutions have been proposed, they are often complicated, require a large number or parts, and are thus expensive. Furthermore, certain solutions are limited in their application and how they might be packaged and so may only be able to mate with other connectors, or only within a circuit board scenario. As such, they are limited in the signal applications they can support and might be dedicated to only RF signal or only power signal application. Still further, existing solutions often cannot handle a wide tolerance variation at the signal mating interface.

Some existing connector and contacts that implement compressible components also fall short as the spring components used for providing 360-degree grounding are often inconsistent. Those connectors that implement compressible or spring biased ground elements will incorporate the actual spring element into the ground path and therefore introduce impedance variations as the spring flexes. Other designs use compressible interposer components to address tolerance issues and have elastomeric layers with conductive elements therein. Such designs require significant clamping forces for proper usage and can still introduce inconsistency in the ground signal integrity.

Impedance matching in the connector over a wide variety of installations and tolerances is important. This is particularly so with PCB installations wherein the contact surface may be at different spacings and planes with respect to the connector and its contact interface. Solutions are available that implement connectors having movable elements, such as spring loaded pin and ground slide. For example, U.S. Pat. No. 10,069,257 owned by Carlisle Interconnect Technologies is one such solution. There is still a need to offer additional solutions and connectors that address consistent RF impedance characteristics in the connector in various installation environments.

Thus, it is desirable to provide an inline connector for RF signal handling that provides a consistent ground signal integrity as well as a 360-degree ground. It is further desirable to provide such a connector that is scalable and may be packaged and used for hybrid RF and power connectors. It is also desirable for a connector design that operated to support board to board, cable to board and cable to cable applications while handling and managing wide tolerance variations.

SUMMARY OF THE INVENTION

A connector includes a housing that has at least one bore therein. A center conductor element is positioned in the bore and includes a center conductor pin. The center conductor is spring-biased to move longitudinally in the housing bore. A ground sleeve element is coaxially arranged around the center conductor element and is also spring-biased to move longitudinally in the housing bore. The center conductor and ground sleeve are compressible into the housing bore. The center conductor element and ground sleeve are coupled together for moving together in the housing bore and maintaining their same coaxial position with respect to each other when the connector is compressed. In that way, the impedance in the connector is maintained as consistent as the connector is compressed in various states of compression.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serves to explain the invention.

Figure 3A:
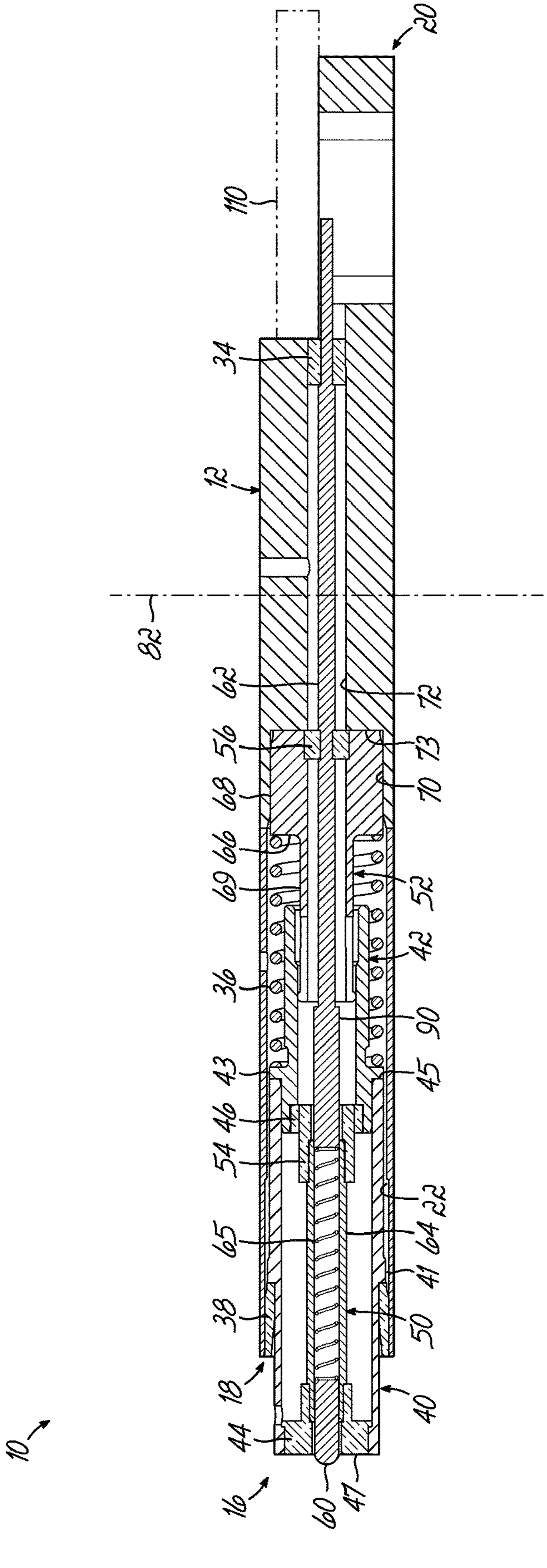
FIG. 3A is a side cross-sectional view of a connector system in accordance with the embodiment of the invention shown in FIG. 1.

4A is a partial side cross-sectional view of a connector system in accordance with the embodiment shown in FIG. 3A showing the connector in a free state.

4B is a partial side cross-sectional view of a connector system in accordance with the embodiment shown in FIG. 3A showing the connector in a state of initial contact.

4C is a partial side cross-sectional view of a connector system in accordance with the embodiment shown in FIG. 3A showing the connector in a compressed state.

4D is a partial side cross-sectional view of a connector system in accordance with the embodiment shown in FIG. 3A showing the connector in a fully compressed state.

Figure 5:
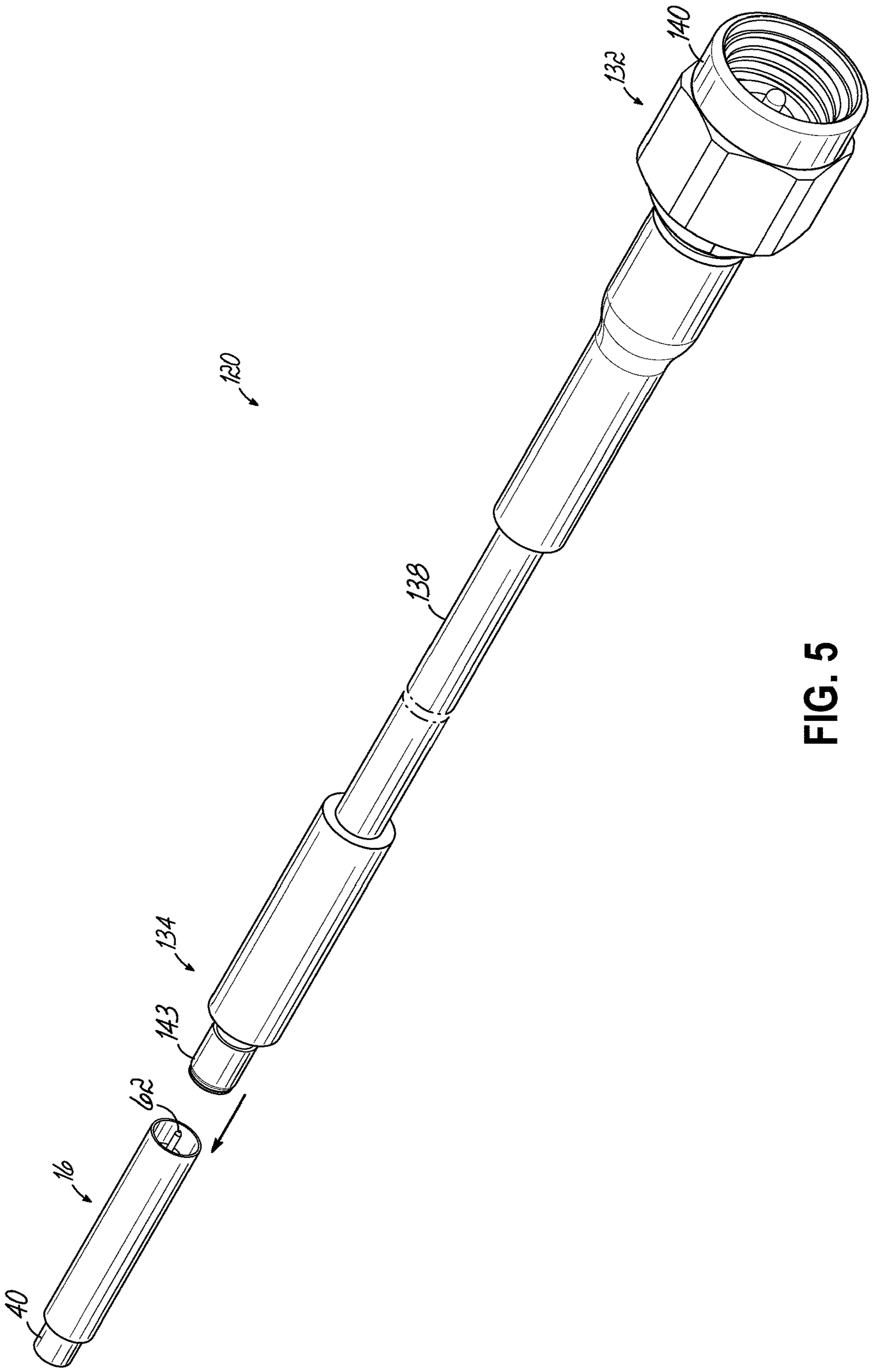

FIG. 5 is a perspective view of a connector system in accordance with another embodiment of the invention incorporated with a cable termination.

6A is a side cross-sectional view of a connector system in accordance with the embodiment shown in FIG. 5 interfacing with a coaxial cable.

6B is a side cross-sectional view of a connector system in accordance with the embodiment shown in FIG. 5 showing the interface connection with a coaxial cable.

DETAILED DESCRIPTION OF EMBODIMENTS OF THE INVENTION

The present invention addresses various needs in the prior art and improves upon the general prior art by providing an RF connector that provides a consistent and synchronized in-line compression of both a spring-biased center conductor element and a spring-biased sliding ground body that is electrically reflective of a ground signal. The center conductor and sliding body move together in a synchronized fashion and maintain their relative positions and electrical relationship with each other over the initial contact and full compression and course of travel in the engagement of a conductive trace on a printed circuit board. In that way, a consistent impedance is maintained between the spring-biased center conductor element and spring-biased sliding ground body over the course of compression and engagement with a conductive surface. The independently spring-biased center conductor element and ground body convey signals directly to a conductive pattern or signal traces on a printed circuit board or to corresponding elements of another mating cable connector. Such inline connectors can be used individually and may also be packaged into high density custom layouts or into commonly available industry connector platforms. Although the connector described herein is suitable for RF signals and particularly high frequency RF signals, it may be used for a variety of applications.

Figure 1:
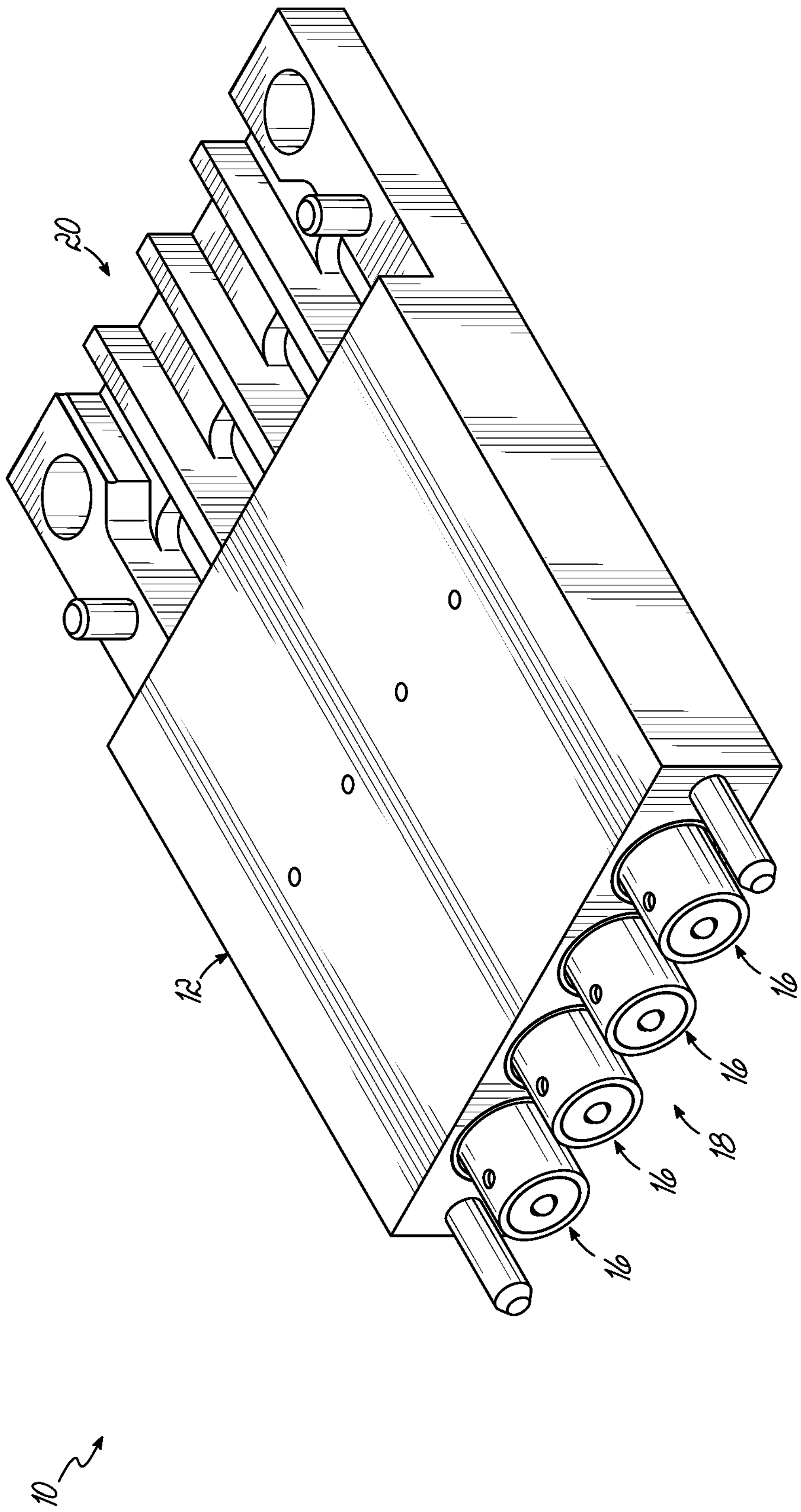
FIG. 1 is a perspective view of a connector system in accordance with one embodiment of the invention.

Turning to FIG. 1, the connector or connector system 10 in accordance with one embodiment of the invention is illustrated. The connector system 10 includes a shell or housing 12 that is configured for receiving and housing one or more individual connectors 16 therein. A single or multiple coaxial connectors 16, as shown, may be presented at a front end of face 18 of the housing while signals conductors are presented at a rear end 20 of the housing. The housing element is made of a suitably robust metal material such as brass, stainless steel or for weight critical applications, an aluminum alloy, for example. The front face 18 of the housing presents the one or more connectors in a coaxial platform having an inner conductor and grounded outer conductor for engagement with a surface and electrical elements, such as signal traces on the surface of a printed circuit board (PCB). For the embodiment in FIG. 1, the rear end 20 of the housing 12 is configured for presenting a center conductor of each coaxial connector 16 to be soldered or otherwise connected to another conductor, such as a stripline conductor of another PCB. However, the rear end 20 of housing 12 and the connector 16 could be configured in the form of another similar connector 16 for signal passage. A common configuration for this type of connector is with the rear end 20 connected to an RF coaxial cable and the coaxial cable that is terminated with the precision connector. The connector 16 can be a single cable assembly or may be ganged together in an array as known in the art. For dense packaging, the connector 16 can accommodate a pitch of 2.5 mm. For cabled assemblies, the rear end 20 and RF coaxial cable may be joined together with an appropriate adaptor. The adaptor can accommodate varying cable sized depending on the application. FIGS. 5-6B illustrate one embodiment of the connector 16 incorporated in a cable assembly. Alternatively, the connector system 10 could couple with one or more cables or could be in the form of some other coaxial connector platform. Therefore, the rear interface of housing 12 and the individual coaxial connectors 16 and the way the signal is conveyed from the connector system 10 is not limited to the exemplary embodiments shown. The operation and elements of the individual connectors 16 are described further herein.

Figure 2:
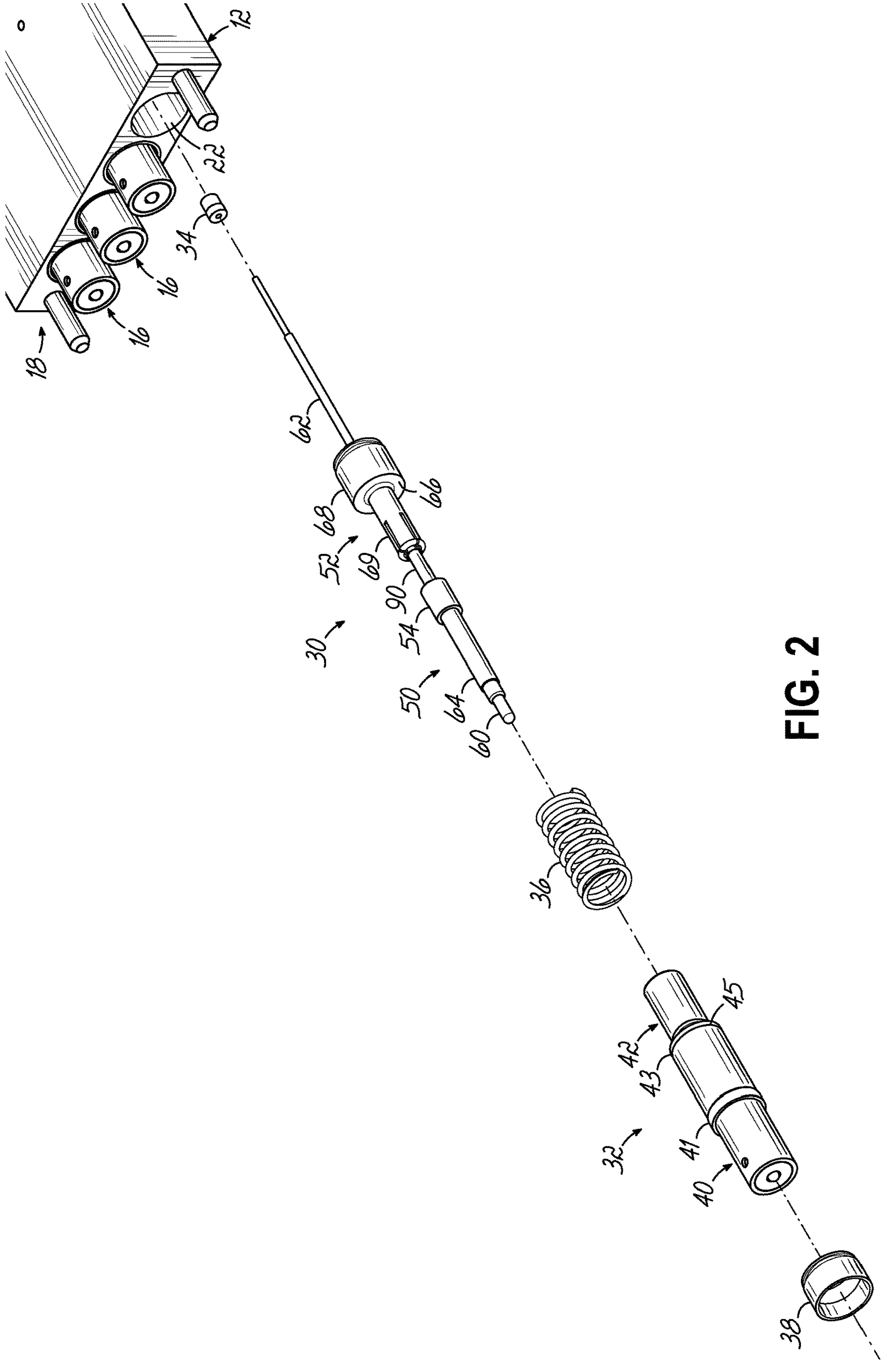
FIG. 2 is an exploded view of elements of a connector in the connector system of the embodiment of the invention shown in FIG. 1.

The RF coaxial connector 16 of the invention may be assembled from the various coaxially arranged parts and then inserted into the housing 12 and particularly into one or more passages or bores 22 formed in the housing 12. Referring to FIG. 2, each connector 16 incorporates a center conductor sub-assembly 30 for presenting the RF signal as well as a sliding body sub-assembly 32 that presents a signal ground for the connector 16. In assembly of the connector in the housing 12 using the sub-assemblies 30, 32, a support insulator element 34 is inserted into passage 22 of the housing 12. The support insulator element 34 supports an end of the center conductor sub-assembly 30 as discussed further herein. Then, the center conductor sub-assembly 30 is press fit into the respective passage 22 of the housing. Next, a spring 36, which provides a spring bias against elements of the sliding body sub-assembly 32, is slid into the passage 22 over the center conductor sub-assembly 30. Then, the sliding body sub-assembly 32 is aligned with and assembled over the center conductor sub-assembly 30 and is also slid into the passage 22 in a coaxial arrangement with the center conductor sub-assembly 30. Finally, to contain all the elements in the passage, a cap 38 is press fit into the housing passage.

Figure 2B:
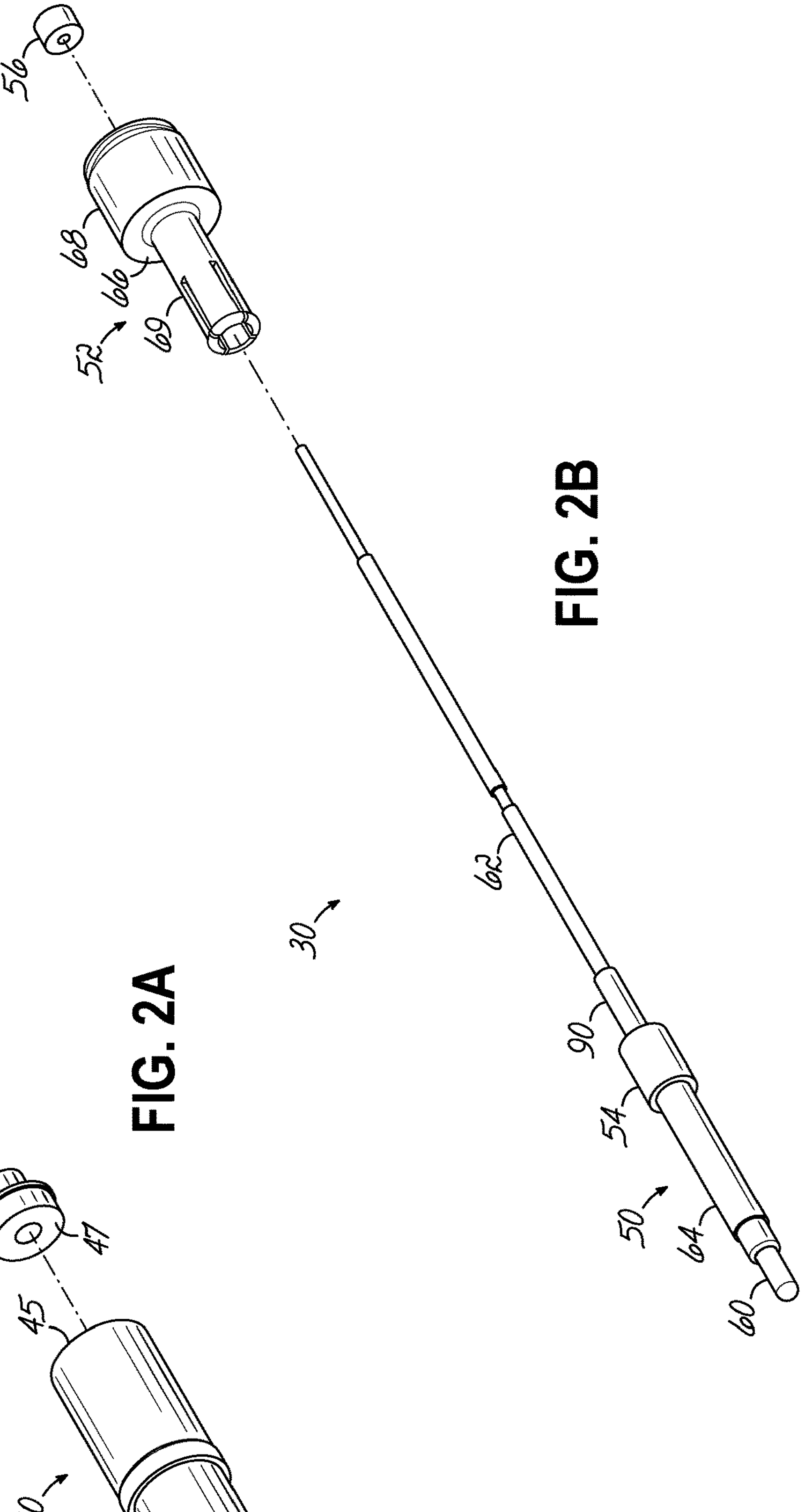
FIG. 2B is an exploded view of further elements of the connector as illustrated in FIG. 2.
Figure 2A:
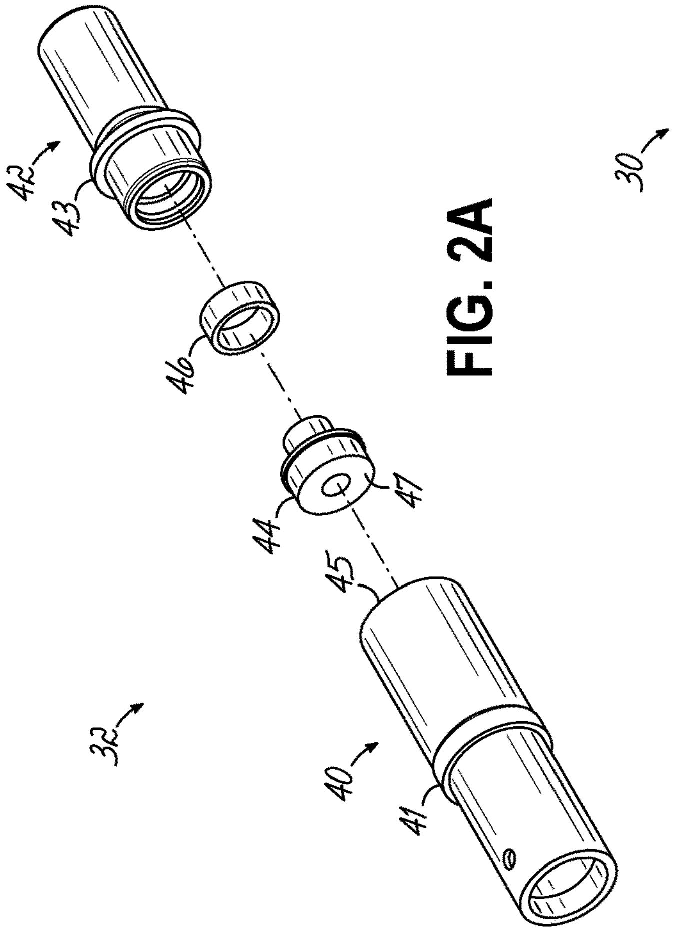
FIG. 2A is an exploded view of elements of the connector as illustrated in FIG. 2.

Referring to FIG. 2A, the sliding body sub-assembly 32 includes a first body 40 and a second body 42 that are coupled together and move together in the housing 12 as part of connector 16 as described herein. The second body 42 fits into the rear of the first body 40 (See FIG. 3A) and a collar 43 on the second body abuts against a back end 45 of the first body. In that way, when the first body 40 moves rearwardly in the passage 22, such as under the forces used for mating the connector to a signal trace, the second body 42 also moves rearwardly. Elements of the center conductor sub-assembly 30 extend coaxially through the first and second bodies 40, 42 as shown in FIG. 3A and are coupled with the bodies 40, 42 and move with the bodies as they are compressed into the housing in the mating process. The first body 40 is presented at face 18 of the housing 12 and acts as a movable ground sleeve for the connector 16 in use. A portion of the first body 40 extends forwardly of the housing 12 as shown in FIG. 1. Herein, the first body 40 will also be referred to as the ground sleeve.

More specifically, also referring to FIG. 2A, the sliding body sub-assembly 32 includes a front insulator element 44 that engages with a front tip of the center conductor sub-assembly 30 and a rear insulator element 46 that engages with another insulator element 54 in the center conductor sub-assembly 30 to hold the center conductor sub-assembly 30 and sliding body sub-assembly 32 in a coaxial relationship as illustrated in FIG. 3A. To assemble the sliding body sub-assembly 32, the front insulator element 44 is positioned in the front end of the first body 40, such as with a press fit into the front end. The front end of the first body 40 is configured to contain the front insulator element 44. Then, the rear insulator element 46 is positioned in the front end of the second body 42, such as with a press fit into the front end. The second body 42 has a passage configured for containing the rear insulator element 46. Then the first body 40 is press fit into the second body 42. The first and second bodies 40, 42 are pressed together until the back end 45 of the first body 40 contacts the collar 43 of the second body 42. The cross-sectional view of FIG. 3A shows the two bodies together in forming the sliding body sub-assembly 32.

Referring to FIG. 2B, the center conductor sub-assembly 30 includes a spring-loaded pin structure 50 and a sliding insulator element 54 on the pin structure 50. A fixed body 52 fits into the housing 12 and includes a barrel portion 68 that may be press fit into the passage 22 and a smaller diameter portion 69 that extends forwardly from the barrel portion 68. As illustrated in FIG. 3A, the passages 22 include a larger diameter portion 70 to receive the connector 16 and the barrel portion 68 and then a smaller diameter portion 72 to receive a rearward portion of the center conductor 62 that extends thorough the fixed body 52 and rearwardly in the housing. The transition between the smaller diameter portion 72 and larger diameter portion of the passage creates a shoulder 73 against which the back end of the fixed body 52 abuts when assembled. See FIG. 3A. The pin structure 50 includes a barrel body 64 that captures a front plunger pin 60 and a rear center conductor 62 that also acts as a plunger. Both the front plunger pin 60 and rear center conductor slide in the barrel body 64 in opposite directions in the hollow barrel body 64 and are opposed by a spring 65 that sits in the barrel body between the pin 60 and center conductor 62 for forming the spring-loaded pin structure 50. The fixed body 52 is assembled over a support insulator element 56 that surrounds the center conductor. The support insulator element 56 is press fit into the back end of the fixed body 52 and supports a portion of the center conductor 62 as it extends through the fixed body and the passage 22 in the housing. The fixed body 52 and the center conductor 62 are thus fixed in the housing while the plunger pin 60 moves in the barrel body 64 and the sliding body sub-assembly 32 moves in the housing. As discussed herein, the plunger pin 60 and barrel body 664 are coupled with the sliding body sub-assembly 32, so that the plunger pin 60, acting as the center conductor, and the first body 40, acting as the ground sleeve move together to keep the same relative position and improve the impedance characteristics of the connector through a range of motion and compression as described.

Figure 3B:
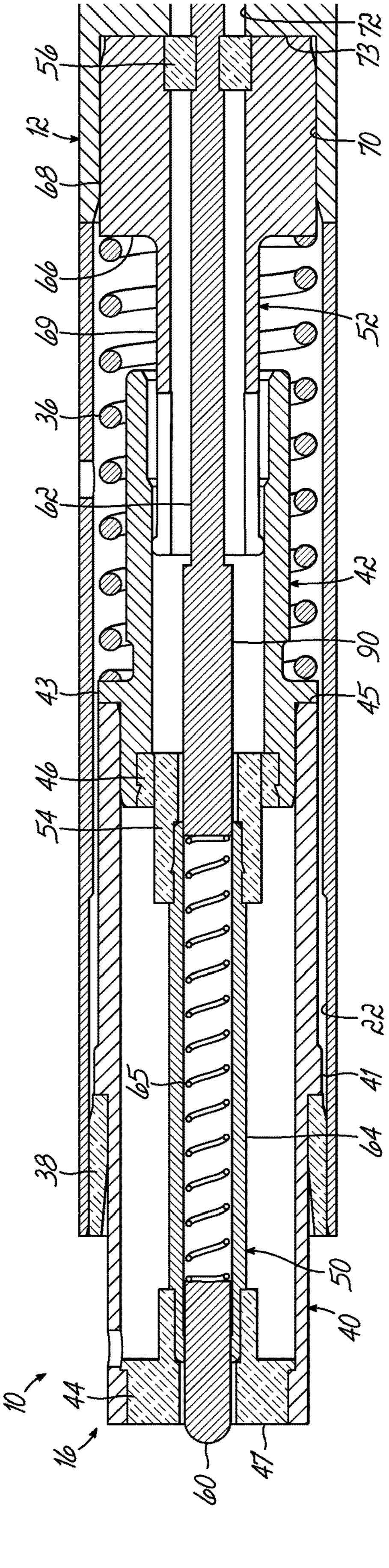
FIG. 3B is a partial side cross-sectional view of a connector system in accordance with the embodiment shown in FIG. 3A.
Figure 3C:
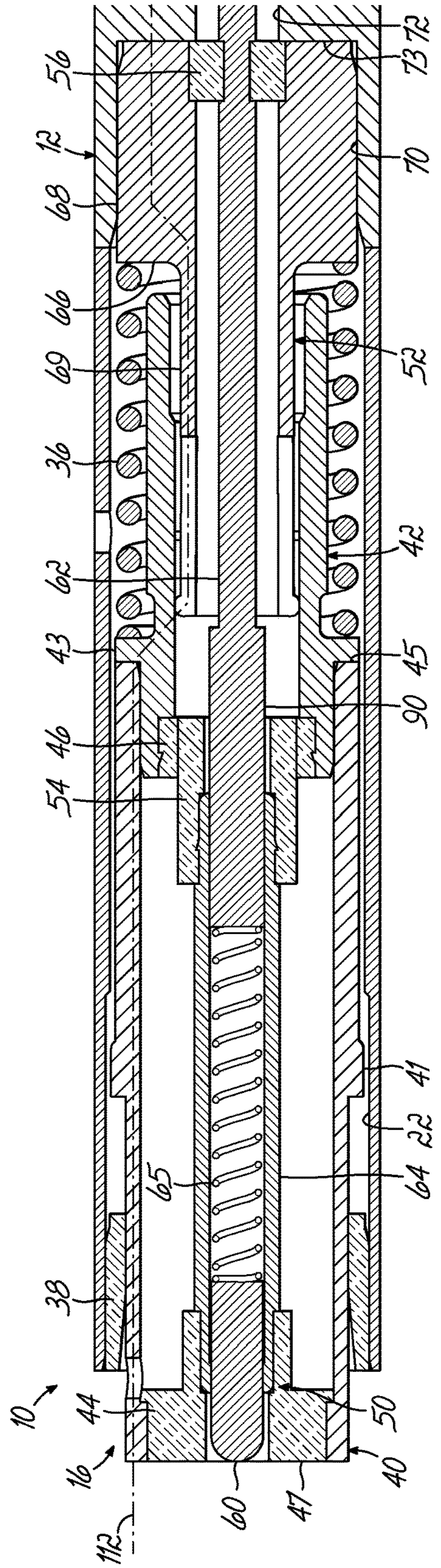
FIG. 3C is a side cross-sectional view of a connector system in accordance with the embodiment of the invention shown in FIG. 3A.

FIGS. 3A, 3B and 3C illustrate side cross-sectional views of the connector 16 of the invention showing the connector in an uncompressed or free state such as in FIGS. 3A, 3B and in a compressed state, such as in FIG. 3C. In the compressed state, the plunger pin and ground sleeve 40 are compressed into the housing 12 under spring bias, for providing connection with a signal bearing medium, such as a signal trace on a PCB. As shown, the plunger pin 60 is coupled to center conductor 62 through the barrel body 64 and spring 65. The center conductor 62 extends through the connector 16 and through housing 12 to be presented at the rear 80 of the housing. The embodiment as illustrated in the figures is configured for PCB edge connection. However, other interfaces may be implemented, such as a PCB vertical mount, a cable connection as shown in FIG. 5, or another precision connector similar to connector 16. As such, from connector plane 82 rearwardly as seen in FIG. 3A, the form factor of the invention may take any number of different forms depending upon how the connector will be utilized to pass the desired signals.

Referring to FIG. 2A, the first sliding body 40 incorporates a shoulder 41 thereon that impacts the cap 38 as shown in FIG. 3A once the connector 16 has been assembled. In that way, the sliding body sub-assembly 32 is contained within the respective aperture 22 of the housing 12. Sliding body sub-assembly 32 which includes the ground sleeve 40 is biased forwardly by spring 36 acting against a collar 43 on the second body 42 and on a forward end of the barrel portion 68 of the fixed body 52. The center conductor sub-assembly 30 is coupled with the body sub-assembly 32. Specifically, referring to FIGS. 3A and 3B, center conductor sub-assembly 30 is coupled at a front end through the front insulator element 44 with the front end of the ground sleeve 40. The barrel body 64 is coupled with the insulator element 44 and pin 60 extends through the insulator element. This couples the barrel body 64 with the ground sleeve 40 at the front end of the connector. At the back end of the barrel body 64, the center conductor sub-assembly 30 couples with the forward edge of the second body 42 through sliding insulator 54 and rear insulator 46. As illustrated in FIGS. 3A-3C, the second sliding body 42 incorporates a bore that is configured to receive rear insulator element 46 that is nested with the sliding insulator element 54 of the center conductor sub-assembly 30 when the elements are positioned coaxially together in housing 12. In that way, the barrel body 64 is captured at opposing ends to move together with body 40 and second body 42 of the sliding body sub-assembly 32 when the elements are compressed for connection. To that end, both the barrel body 64 as well as the sliding insulator element 64 slide along a stationary plunger portion 90 of the center conductor 62 so that the center conductor tube may remain stationary within the housing 12 while plunger pin 60, barrel body 64, and sliding body sub-assembly 32 may move with respect to the housing passage 22 and center conductor 62.

In accordance with one aspect the invention, as illustrated in FIG. 3C, the retracted plunger pin 60 and ground sleeve 40 when compressed, will maintain the same relationship with respect to each other throughout the length of travel of those elements within connector 16. That is, the same relative positioning will be maintained between the plunger pin 60 and the ground sleeve 40 from initial contact with the contact surface through a nominal stroke and all the way to a full stroke as discussed herein with respect to FIGS. 4A-4D. In that way, the impedance characteristics of the connector 16 are maintained throughout the stroke of the compressed elements of the connector.

In the center conductor sub-assembly 30, both the plunger portion 90 of the center conductor 62 and the plunger pin 60 operate under a spring bias provided by spring 65 extending between one end of the plunger pin 60 and an opposing end the plunger portion 90. As such, each of those elements are free to extend toward each other, and against the spring bias when the connector is engaged with a PCB surface for connection. To that end, the plunger pin 60 retracts completely inside of ground sleeve 40 and into barrel body 64 for further compression of pin 60 and ground sleeve 40 together. Compression of the connector 16 and housing 12 drives the ground sleeve and sliding body sub-assembly 32 as well as pin 60 and barrel body 64 rearwardly against the bias of spring 36 for full compression. During such compression, the plunger portion 90, which is stationary with respect to the connector 16, is driven forwardly and further into barrel body 64. Therefore, the barrel body 64 experiences a dual plunger action compressing the spring 65.

To assemble the center conductor sub-assembly 30, the sliding insulator element 54 is assembled onto the spring-loaded pin structure 50. Then the fixed body 50 is slid over the spring-loaded pin structure 50. The support insulator element may then be positioned along the length of the center conductor to the appropriate position. Then the fixed body 50 is assembled over the support insulator element. The assembled connector 16 is illustrated in FIGS. 3A-3C in the free or uncompressed state and the compressed state, respectively.

Figure 4A:
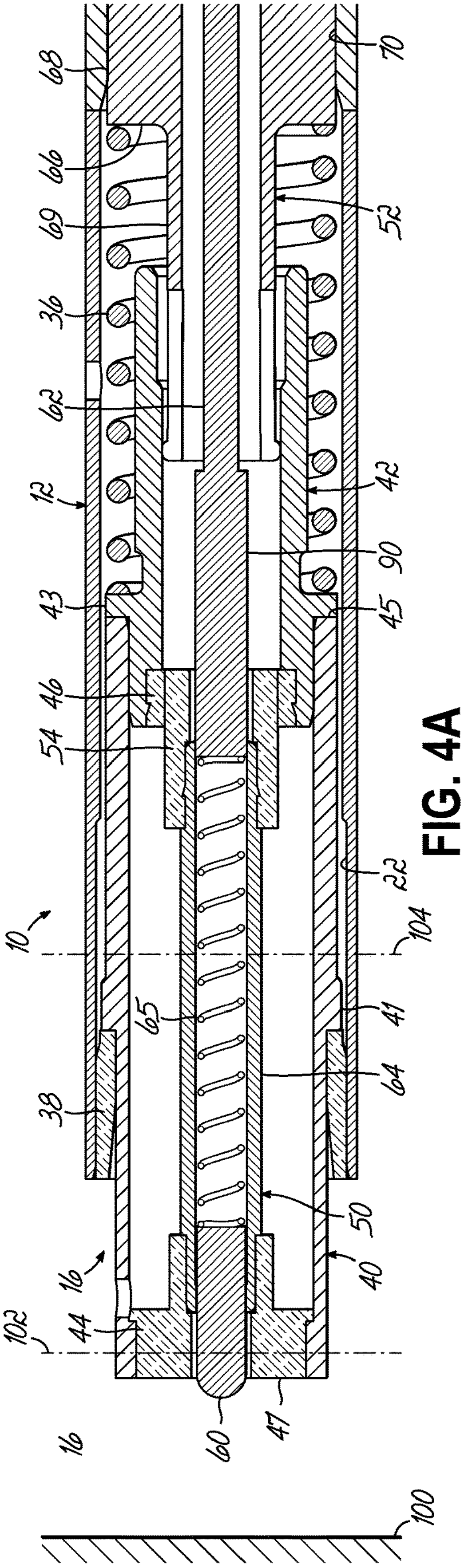
FIG. 4A is a partial side cross-sectional view of a connector system in accordance with the embodiment shown in FIG. 3A showing the connector in a free state.

FIGS. 4A-4D illustrates the operation of connector 16 of the invention and the travel of the center conductor plunger pin 60 as well as the travel of the ground sleeve 40 relative surface 100 and connector 16. FIG. 4A shows the connector 16 in a generally free state, where it has not contacted a surface 100 such as a PCB surface carrying one or more signal traces engaged by the connector 16. Each of the sliding body sub-assembly 32 and the conductor sub-assembly 30 are fully extended under the bias of springs 36 and 65. As illustrated, the plunger pin 60 presenting the center conductor at the front of the connector is extended past the front surface 47 of the front insulator 44 and ground sleeve 40. The sliding body sub-assembly or sleeve 40 also extends forwardly from the housing 12 and is held at a fully extended position by the engagement of shoulder 41 of ground sleeve 40 and the cap 38 which is pressfit into the housing 12 for holding the extended connector portions therein.

Figure 4B:
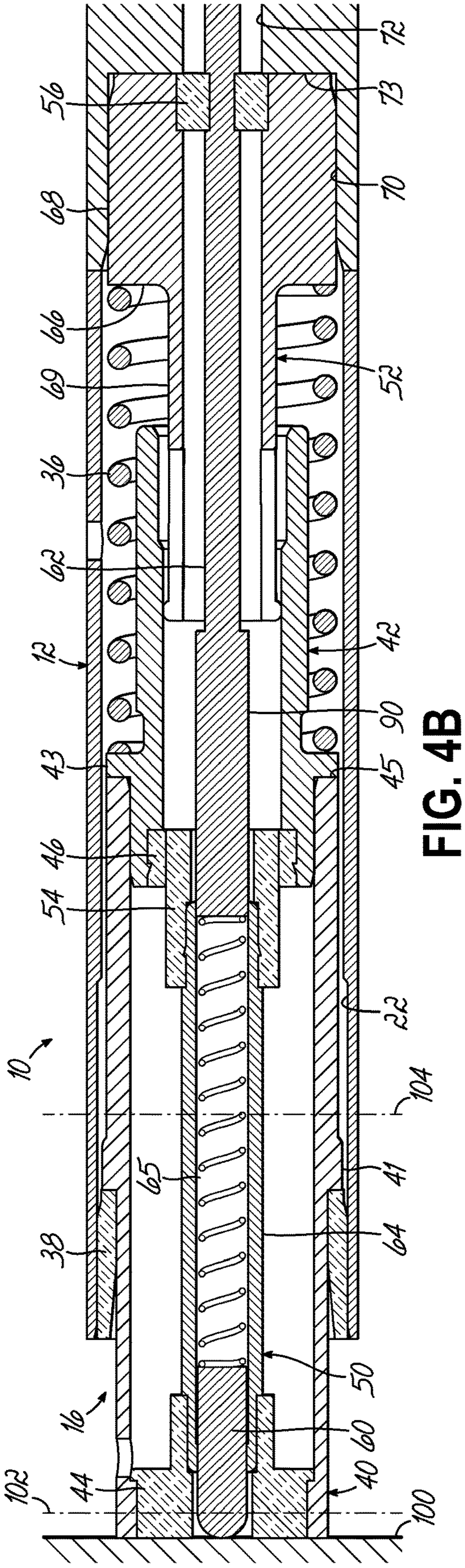

Referring now to FIG. 4B, initial contact with a PCB surface 100 is shown wherein the tip of the plunger pin 60 engages surface 100 and is driven into the ground sleeve so its end is co-planar with the end of the ground sleeve. Similarly, the forward end of the ground sleeve at surface 47 provided by the first sliding body 40 also contacts surface 100. As illustrated in FIG. 4B, the tip of the plunger pin 60 is pushed to be co-planar with the front surface 47 of the front insulator element 44 and ground sleeve. In that way, the center conductor and ground sleeve of the connector 16 provide an initial contact with surface 100 at surface 47. As illustrated by the reference planes 102 and 104 in the figures, an impedance in the connector 16 will be presented to surface 100 and to any conductive patterns or traces on the PCB surface. In accordance with a feature the invention, the same impedance at plane 102 and at plane 104 are maintained throughout the full stroke of connector 16 from both initial contact all the way to full compression in contact (see FIG. 4D).

In accordance with another feature of the invention, once initial contact is made as illustrated in FIG. 4B, the plunger pin 60 and the sliding body 40 would travel together and will be directed inwardly further into housing 12 maintaining their same relative position with respect to each other. The coaxial arrangement of the center conductor is presented by the plunger pin 60 and ground sleeve 40. In one embodiment of the invention, for example, the initial contact may utilize travel of the plunger pin 0.007 inch.

Figure 4C:
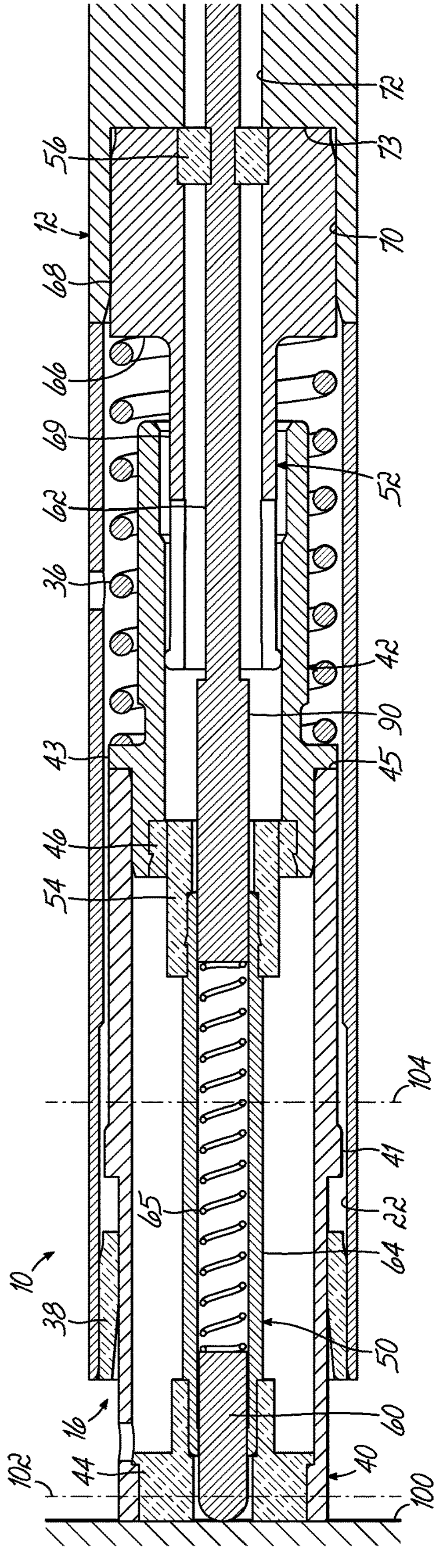

Referring to FIG. 4C, a nominal stroke compression of the connector is illustrated in the direction of the housing 12 and connector 16 against surface 100. For example, such movement may include further travel of the plunger pin 60 and sliding body 40 another 0.020 inch. As noted and shown, the center conductor is presented by the plunger pin 60 and the ground of the ground sleeve is presented by the first sliding body 40 that move together and maintain the same relative position across planes 102 and 104 as seen in FIG. 4C for the entire travel of the connector. The first sliding body 40 moves rearwardly in the housing 12 against the bias of spring 36 acting on the second sliding body 42 and the coupled first sliding body 40 as the spring is compressed against barrel portion 68 of the fixed body 52. At the same time, the barrel body 64 and plunger pin 60 also move rearwardly with first sliding body 40 (ground sleeve) and the second sliding body 42. Since the portion of the center conductor 62 including plunger portion 90 are stationary and coupled with the fixed body 52 through support insulator element 56 the barrel body 64 as well as sliding insulator element 54 and rear insulator element 46 also slide rearwardly in the sliding body sub-assembly 32 against the bias of spring 65. That is, plunger portion 90 moves further into barrel body 64 against the bias of spring 65, the barrel body 64 and sliding body 40 and other coupled elements move rearwardly in the housing 12 away from surface 100.

Figure 4D:
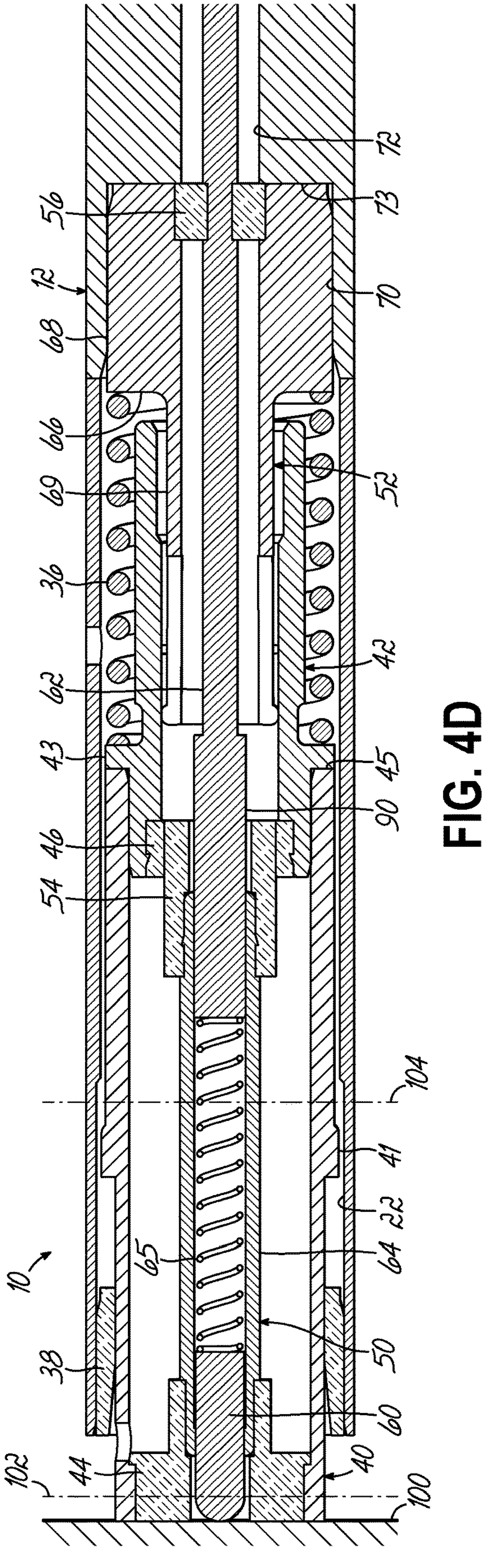

FIG. 4D illustrates further movement or full compression and a full stroke of connector 16, such as, for example, with a travel of 0.040 inch. In the full stroke, the physical stop of the sliding body 40 is provided by the shoulder 41 on the first sliding body and a corresponding shoulder 49 formed in the passages 22 of the housing that receives the connectors 16. As also seen in FIG. 4D, the relative position of the center conductor plunger pin 60 and the ground sleeve provided by the first sliding body 40 maintain the same their relative position in planes 102 and 104. As such, the impedance is the same throughout initial contact all the way up to the full stroke or full compression of the connector against surface 100. As illustrated in FIG. 4D, through the reference plane 102, the dielectric constant is provided by the insulator element 44 as the plane passes through that insulator element and plunger pin 60. Moving rearwardly to the reference plane 104, there is a slight change in diameter between the plunger pin 60 and the barrel body 64. However, since the dielectric between the ground sleeve 40 and the barrel body 64 is air, the dielectric constant is less at reference plane 104 than at reference plane 102. This offsets the change in the diameter from the plunger pin 60 to the barrel body 64. Therefore, the present invention provides a connector that is able to handle various different mounting scenarios and distances between the connector housing 12 and an element such as a printed circuit board surface 100.

As illustrated in FIG. 3A, rearwardly in the housing, center conductor 62 may be coupled, such as to another circuit board 110 or may be coupled to a vertical mounted printed circuit board (not shown). The center conductor 62 would be electrically coupled with a signal trace or other conductor of the circuit board for passing signals from the connector 16 to the board. Similarly, a precision connector, as illustrated by connector 16, may also be duplicated and incorporated on the backend of the housing 12 so that you have two oppositely facing precision connectors 16 within the housing 12.

Referring to FIG. 3C, a grounding path 112 is illustrated between the front of the connector 16 and rear of the connector where it would engage with a signal element, such as a similar connector or a printed circuit board at the backend of housing 12. The dual plungers presented in the barrel body 64 by plunger pin 60 and plunger portion 90 provide a compressibility at each end of the barrel body 64. The barrel body 64 is fixed to the sliding bodies 40, 42 provided by the sliding body sub-assembly. Both the plunger pin 60 and barrel body 64 move with the grounded bodies 40, 42. One particular advantage provided by the invention is that the contact plunger pin 60 and the barrel body 64, representative of the center conductor, translate together. For good impedance performance, the different diameters of the plunger pin 60 and barrel body 64 are compensated by using materials with different dielectric constants, such as in planes 102 and 104. This allows for the impedance matching of the two different sections in the connector 16. Impedance is matched for the plunger pin 60 and barrel body 64 resulting in the same signal and RF performance over the travel stroke of the connector 16. This is an improvement over other RF connectors that do not maintain a similar impedance and performance over the travel stroke of the connector from initial compression to full compression. In the prior art, the RF signal and performance varies and is not constant.

FIGS. 5-6B illustrate an alternative embodiment of the invention wherein the connector is terminated in a cable assembly rather than to a circuit board as illustrated in FIG. 3A. FIG. 5 illustrates a single connector 16 coupled to a coaxial cable assembly 120. However, as would be understood by a person of skill in the art, multiple connectors 16 may be densely packed in a housing 12 and then each coupled with a respective cable assembly 120. The cable assembly 120 might then be terminated with another suitable connector structure 132, such as an SMA connector structure, for example. Alternatively, another connector 16 as described herein may be used as a terminating connector for the cable assembly 120. To that end, another adaptor structure 134 as described might be used at the other end of the cable assembly.

Figure 6A:
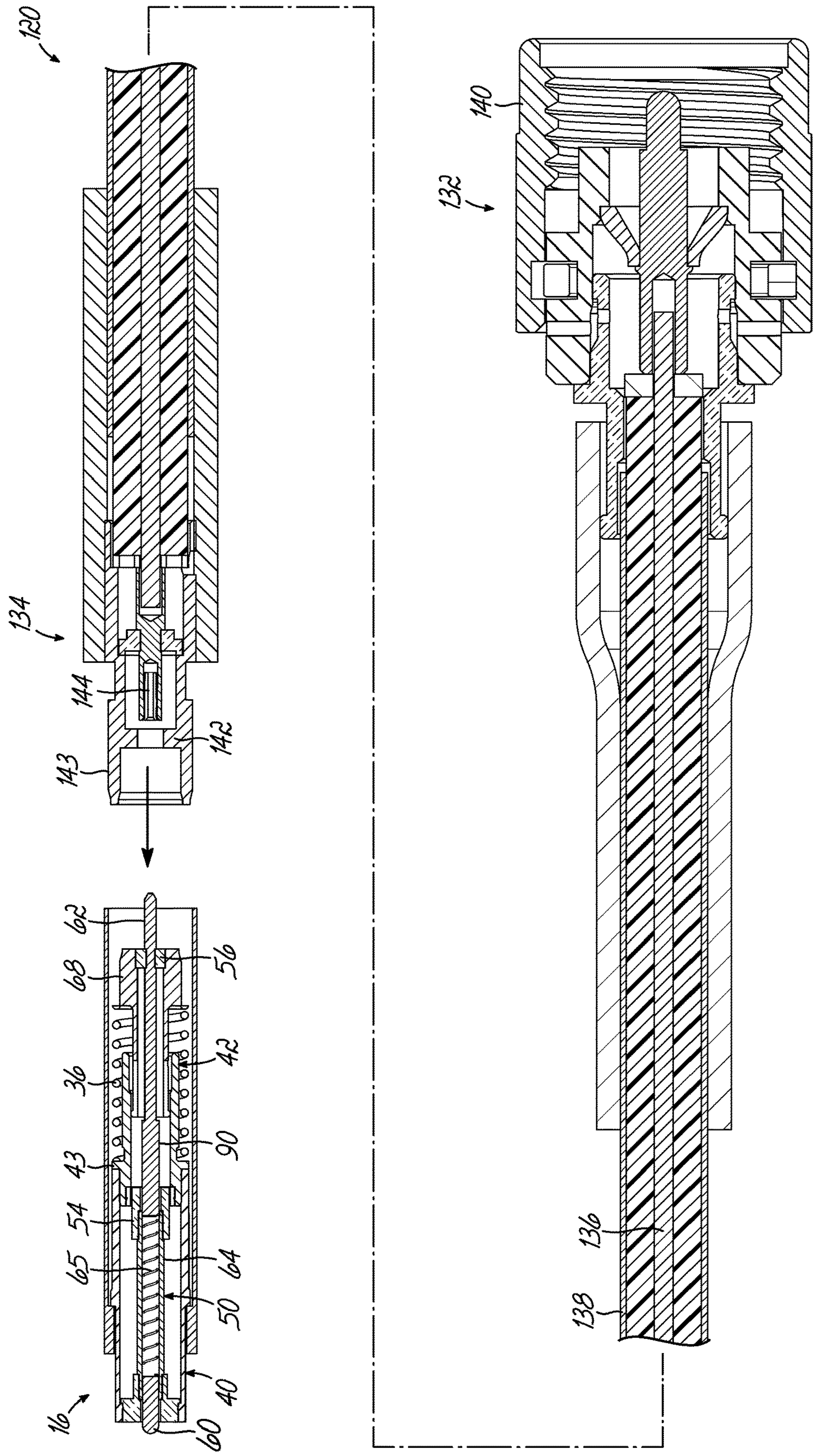
Figure 6B:
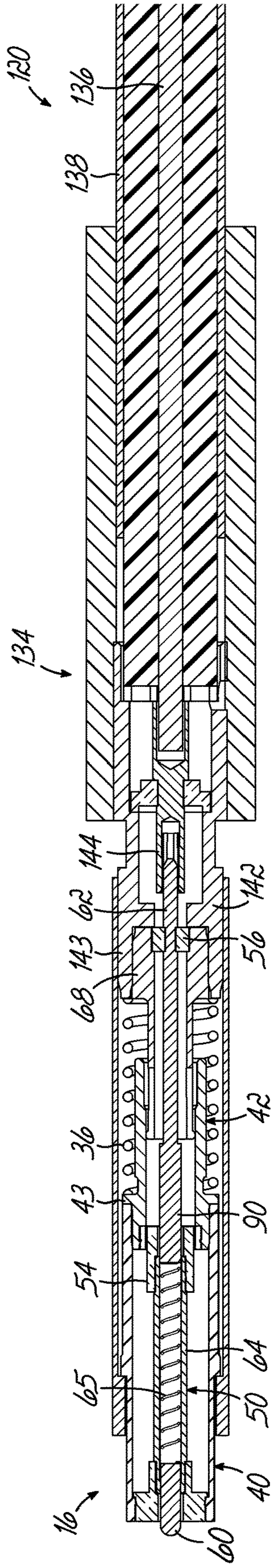

FIGS. 6A and 6B illustrate an adaptor structure 134 that might be used for interfacing the connector 16 of the invention with a cable assembly 120. Cable assembly 120 includes a coaxial cable having a suitable center conductor 136 and outer conductor 138 and terminated in a connector structure 140 that may be any suitable connector form factor as desired. Opposite the connector structure 140, the adaptor structure interfaces with the other end of the cable assembly as shown, and particularly interfaces with the inner and outer conductors 136, 138 to present them to the end of connector 16. Specifically, adaptor 134 includes a body structure 142 that electrically interfaces/couples with the outer conductor 138 and that forms a socket 143 for receiving the barrel portion 68 of the connector 16. The adaptor 134 further includes a socket 144 that is configured for interfacing with the center conductor 62 of connector 16. The center conductor may be in the form of a pin structure for plugging into socket 144. As noted, the configuration in FIGS. 6A, 6B may involve multiple connectors 16 and cable assemblies 120.

FIG. 6B illustrates the connector 16 plugged in to the adaptor 134 at the back end of the connector 16. The barrel portion 68 is plugged into socket 143 and the center conductor 62 is plugged into socket 144. In that way, the electrical signals of the connector 16 are presented to cable assembly 120 for further processing and signal handling.

While the present invention has been illustrated by the description of the embodiments thereof, and while the embodiments have been described in considerable detail, it is not the intention of the Applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of Applicant's general inventive concept.

What is claimed is:

1. A connector comprising:

a housing having a bore therein;

a center conductor element positioned in the bore and including a center conductor pin, a plunger portion and a movable barrel body having a spring therein, the center conductor pin positioned at a front end of the barrel body and the plunger portion positioned at a rear end of the barrel body, the center conductor pin being spring-biased to move longitudinally in the barrel body for being compressed;

the barrel body and center conductor pin moving longitudinally in the housing bore with respect to the plunger portion when the center conductor element is compressed;

a ground sleeve element coaxially arranged around the center conductor element and spring-biased to move longitudinally in the housing bore for being compressed;

the ground sleeve element being coupled with the barrel body of the center conductor element at a plurality of positions along the barrel body so that the center conductor element barrel body and ground sleeve element are coupled together for moving together in the housing bore when compressed and maintaining their same coaxial position in the housing bore with respect to each other when the connector is compressed.

2. The connector of claim 1 wherein the plunger portion is stationary within the housing bore, the spring acting against the plunger portion to provide the spring bias of the center conductor pin.

3. The connector of claim 1 wherein the center conductor pin is independently movable in the barrel body with respect to the ground sleeve element.

4. The connector of claim 1 wherein the ground sleeve element is coupled with the barrel body of the center conductor element at a front end of the barrel body and a rear end of the barrel body for moving together in the housing bore when the connector is compressed.

5. The connector of claim 1 wherein the ground sleeve element includes at least a first body and a second body, the first and second bodies axially coupled to move longitudinally in the housing bore when the ground sleeve element is compressed.

6. The connector of claim 1 further comprising a spring positioned in the housing bore to act against the ground sleeve element for spring biasing the ground sleeve element.

7. The connector of claim 1 wherein the plunger portion is configured for providing a portion of the center conductor element at a rear of the connector.

8. A connector assembly comprising:

a housing having a plurality of bores therein;

a plurality of connectors coupled in the bores of the housing, each connector including:

a center conductor element positioned in a respective bore and including a center conductor pin, a plunger portion and a movable barrel body having a spring therein, the center conductor pin positioned at a front end of the barrel body and the plunger portion positioned at a rear end of the barrel body, the center conductor pin being spring-biased to move longitudinally in the respective barrel body for being compressed;

the barrel body and center conductor pin of each center conductor element moving longitudinally in the respective housing bore with respect to the respective plunger portion when the center conductor element is compressed;

a ground sleeve element coaxially arranged around the center conductor element and spring-biased to move longitudinally in the respective housing bore for being compressed;

the ground sleeve element being coupled with the barrel body of the center conductor element at a plurality of positions along the barrel body so that the center conductor element barrel body and ground sleeve element are coupled together for moving together in the housing bore when compressed and maintaining their same coaxial position with respect to each other when a respective connector of the connector assembly is compressed.

9. The connector assembly of claim 8 wherein the plunger portion is stationary within the housing bore, the spring acting against the plunger portion to provide the spring bias of the center conductor pin.

10. The connector assembly of claim 8 wherein the center conductor pin is independently movable in the barrel body with respect to the ground sleeve element.

11. The connector assembly of claim 8 wherein the ground sleeve element is coupled with the barrel body of the center conductor element at a front end of the barrel body and a rear end of the barrel body for moving together in the housing bore when a respective connector of the connector assembly is compressed.

12. The connector assembly of claim 8 wherein the ground sleeve element includes at least a first body and a second body, the first and second bodies axially coupled to move longitudinally in the housing bore when the ground sleeve element is compressed.

13. The connector assembly of claim 8 further comprising a spring positioned in the housing bore to act against the ground sleeve element for spring biasing the ground sleeve element.

14. The connector assembly of claim 8 wherein the plunger portion of a connector is configured for providing a portion of the center conductor element at a rear of the connector, the connector assembly housing configured for interfacing with a circuit board, the center conductor configured to electrically couple with a conductor of the circuit board.

15. The connector assembly of claim 8 wherein the plunger portion of a connector is configured for providing a portion of the center conductor at a rear of the connector, the connector assembly housing configured for interfacing with a cable, the center conductor configured to electrically couple with a conductor of the cable.

16. The connector assembly of claim 15 wherein a connector includes a body electrically coupled with the ground sleeve element, the connector assembly further comprising an adaptor electrically coupled with a cable, the adaptor configured to receive the center conductor and body of a connector for electrically coupling the cable and connector assembly.

* * * * *